United States Patent [19]

Goyne

[11] Patent Number: 4,620,804
[45] Date of Patent: Nov. 4, 1986

[54] BEARING AND GREASE SEAL STRUCTURE

[76] Inventor: Thomas S. Goyne, Box No. 75, Helfenstein, Pa. 17939

[21] Appl. No.: 734,053

[22] Filed: May 15, 1985

[51] Int. Cl.⁴ .............................................. F16C 17/10
[52] U.S. Cl. .................................. 384/275; 384/281; 384/292
[58] Field of Search ............... 384/275, 281, 292, 280, 384/398, 399, 296

[56] References Cited

U.S. PATENT DOCUMENTS

| 997,919 | 7/1911 | Jones | 384/275 |
| 2,479,349 | 8/1949 | Hagg | 384/292 |
| 2,673,131 | 3/1954 | Kistler | 384/292 |
| 4,342,536 | 8/1982 | Goyne | 415/170 |

Primary Examiner—Lenard A. Footland
Attorney, Agent, or Firm—Buell, Ziesenheim, Beck & Alstadt

[57] ABSTRACT

A bearing and seal structure and a vertical slurry pump incorporating such bearing and seal are provided including a housing surrounding a shaft for submerged operation comprising a housing surrounding a shaft, a rotatable sleeve removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve in contact with the rotatable sleeve and a continuous pressure lubricant source supplying continuous lubrication to said passage means and between the rotatable and stationary sleeves.

16 Claims, 3 Drawing Figures

BEARING AND GREASE SEAL STRUCTURE

This invention relates to a bearing and grease seal structure and particularly to a bearing and grease seal for use at the suction hood of vertical centrifugal pumps.

Vertical centrifugal pumps are well known and are used in a variety of systems which require pumping from a sump or the like. One of the problems with such pumps is the difficulty of protecting submerged bearings at the pump or suction hood. As a result, it has been common practice to provide what are known in the trade as cantilever pump shafts to eliminate the bottom submerged bearing. Such pumps are exemplified by Goyne Pump Co., Type 400V Volute Vertical Pump, which uses a cantilever shaft. Such shafts are expensive and limit the pumps reach into a sump. On the other hand, submerged bearings historically have been so difficult to protect against slurry penetration and subsequent bearing loss that vertical pumps using them have been expensive to maintain.

I have developed a bearing and grease seal structure which eliminates these problems and permits high speed submerged pump operation in slurrys over long periods without damage to the bearing. The bearing of this invention will be illustrated in connection with a vertical centrifugal pump in which it has particular utility it can, of course, be used in connection with other shaft structures operating in a submerged fluid.

I provide a bearing housing surrounding a shaft for submerged operation, a rotatable sleeve removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve and to the rotatable sleeve, continuous pressure lubricant source supplying continuous lubrication between the rotatable and stationary sleeves through said passage means. Preferably, grease directing means is provided in the periphery of the rotatable sleeve. The rotatable sleeve is preferably provided with a radial flange intermediate its ends running in a groove in the fixed sleeve into which the lubricant passage discharges. The peripheral surface of the radial flange is preferably provided with an annular groove with diagonal grooves extending therefrom to the edge of the flange, said diagonal grooves being substantially eually divided to opposite sides of the flange. Preferably, the two sleeves are made of bearing bronze to provide the submerged bearing for the shaft.

In the foregoing general description I have set out certain objects, purposes and advantages of my invention. Other objects, purposes and advantages of the invention will be apparent from a consideration of the following description and the accompanying drawings in which.

Figure 1:
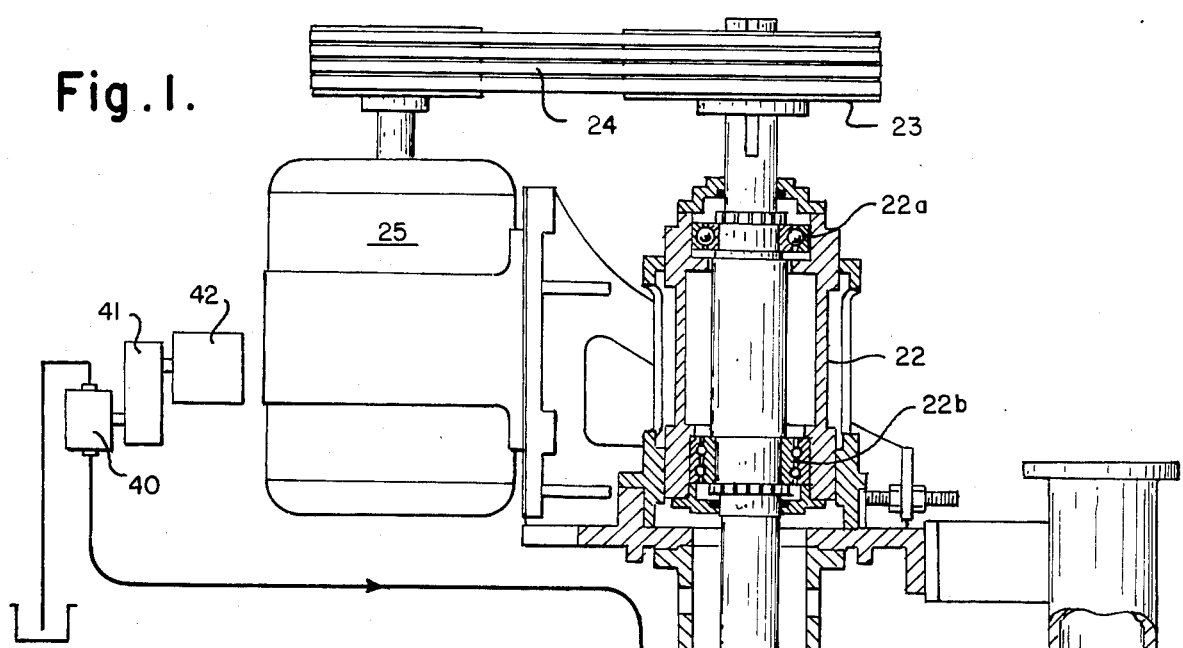
FIG. 1 is a vertical section through a vertical centrifugal pump embodying the bearing and seal of this invention.

Referring to the drawings, I have illustrated a centrifugal pump housing 10 in the form of a volute casing 11 having an end closure 12 forming a pump chamber in which impeller 13 rotates and discharges through collar 14 to vertical discharge elbow 15 and pipe 16. The suction side of impeller 13 is open to slurry in sump 17 through suction chamber 18 formed by strainer 19 and suction hood 20. Impeller 13 is mounted on the end of an elongate vertical shaft 21a which extends into suction hood 20 and bearing housing support 22 and is connected to main drive shaft 21 by connector 33. Main drive shaft 21 is provided at the end opposite impeller 13 with drive pulleys 23. The drive pulleys 23 are driven by belts 24 from motor 25. Bearing housing 22 has a top radial bearing 22a and a bottom thrust bearing 22b. The suction hood 20 carries the bearing and seal 27 of this invention. Shaft 21 extends through bearings 22a and 22b and is supported by connector 33 in bearing 31 for rotation.

Figure 2:
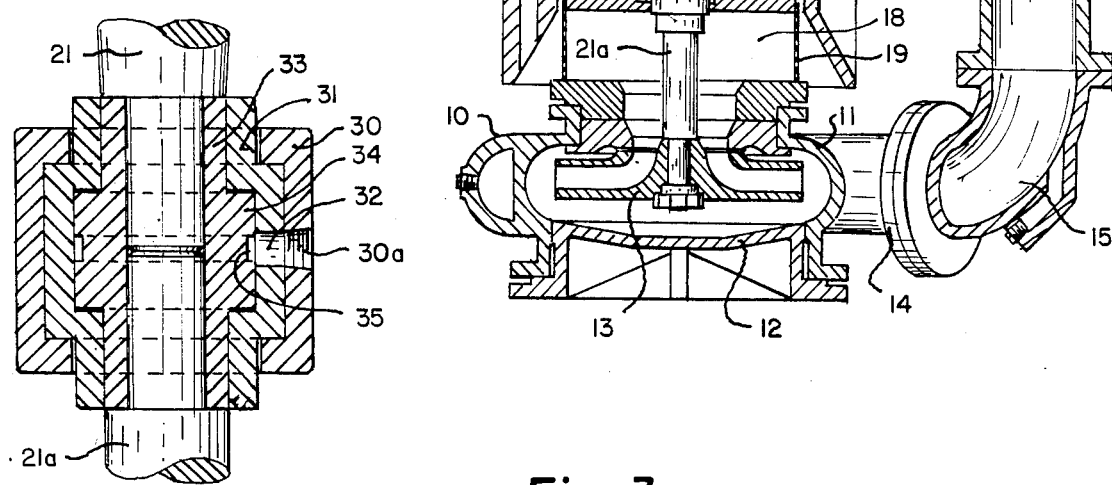
FIG. 2 is a section through the bearing and seal of FIG. 1.
Figure 3:
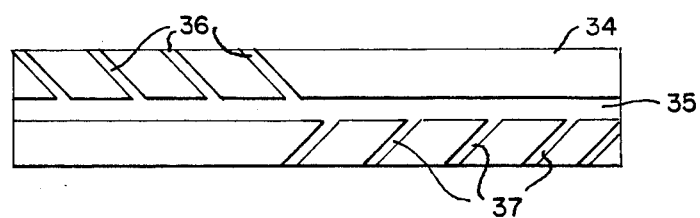
FIG. 3 is a plan view of the unrolled rotatable sleeve of the bearing and seal of FIGS. 1 and 2.

Bearing and seal 27 is made up of a split housing 30 (FIG. 2) having a general channel shape and carrying a fixed or stationary split sleeve bearing 31 of bearing bronze having a generally U-shaped central portion intermediate its ends corresponding to the channel shape of the housing 30 and received therein. A passage 32 extends through sleeve 31 and communicates with inlet 30a in housing 30. The connector 33 connecting shaft 21 and shaft 21a is rotatable therewith inside sleeve 31. The sleeve 31 can be either a connector between two shaft ends as shown or merely a support sleeve on a single shaft. Sleeve 33 has a central radial flange 34 which fits in the channel of sleeve 31 and carries an annular groove 35 aligned with passage 32. (Diagonal grooves 36 on one side of groove 35 extends half way around flange 34 and diagonal grooves 37 on the other side of groove 35 extend the other half way around flange 34. Groove 35 is connected by passage 32 to inlet 30a which is in turn connected to a positive displacement grease pump 40 such as a gear pump driven by a reducer 41 and drive motor 42 to supply lubricant under continuous pressure greater than the external pressure on the bearing and seal into the interior of sleeves 31 and 33.) The grooves 35, 36 and 37 then feed grease to one side of the flange and seal 34 for one half revolution and then to the other side for the other half revolution of the shaft to lubricate the sleeves and prevent entry of the pumped liquid or slurry into the area between the sleeves.

The structure of the present invention combines a bearing and seal in an arrangement which is much simplier, much less expensive and far superior to anything heretofore available. The seal is superior to any available for the purpose and the lubrication is such that higher speeds are possible in vertical slurry pumps than heretofore.

In the foregoing specification I have set out certain preferred embodiments and practices of this invention, however, it will be understood that the invention may be otherwise embodied with the scope of the following claims.

I claim:

1. A bearing and seal structure for submerged operation comprising a housing surrounding a shaft, a rotatable sleeve connector removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve in contact with the rotatable sleeve and a continuous pressure lubricant source supplying continuous lubrication to said passage means and between the rotatable and stationary sleeves and wherein the rotatable sleeve connector connects two coaxial shaft ends.

2. A bearing and seal structure as claimed in claim 1 wherein the continuous pressure lubricant source is a positive displacement pump supplying lubricant at a pressure greater than the pressure surrounding the bearing and seal.

3. A bearing and seal structure as claimed in claim 1 wherein the pump is a low speed gear pump.

4. A bearing and seal structure as claimed in claim 1 or 2 or 3 wherein the stationary sleeve is made of bearing bronze.

5. A bearing and seal structure as claimed in claim 4 wherein the grease directing means is an annular groove in the periphery of the rotatable sleeve connector in radial alignment with the passage means and diagonal grooves extending therefrom substantially equally divided on opposite sides of said annular groove.

6. A bearing and seal structure as claimed in claim 5 or 2 or 3 wherein the rotatable sleeve connector is provided with grease directing means.

7. A bearing and seal structure as claimed in claim 6 wherein the grease directing means is an annular groove in the periphery of the rotatable sleeve in radial alignment with the passage means and diagonal grooves extending therefrom substantially equally divided on opposite sides of said annular groove.

8. A bearing and seal structure for submerged operation comprising a housing surrounding a shaft, a rotatable sleeve connector removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve in contact with the rotatable sleeve and a continuous pressure lubricant source supplying continuous lubrication to said passage means and between the rotatable and stationary sleeves and wherein the grease directing means is an annular groove in the periphery of the sleeve in radial alignment with the passage means and diagonal grooves extending therefrom substantially equally divided on opposite sides of said annular groove.

9. A bearing and seal structure as claimed in claim 8 wherein the continuous pressure lubricant source is a positive displacement pump supplying lubricant as a pressure greater than the pressure surrounding the bearing and seal.

10. A bearing and seal structure as claimed in claim 8 wherein the pump is a low speed gear pump.

11. A bearing and seal structure for submerged operation comprising a housing surrounding a shaft, a rotatable sleeve connector removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve in contact with the rotatable sleeve and a continuous pressure lubricant source supplying continuous lubrication to said passage means and between the rotatable and stationary sleeves and wherein the stationary sleeve is made of bearing bronze.

12. A bearing and seal structure as claimed in claim 11 wherein the continuous pressure lubricant source is a positive displacement pump supplying lubricant at a pressure greater than the pressure surrounding the bearing and seal.

13. A bearing and seal structure as claimed in claim 11 wherein the pump is a low speed gear pump.

14. A bearing and seal structure as claimed in claim or 12 or 15 wherein the rotatable sleeve connector is provided with grease directing means.

15. A bearing and seal structure for submerged operation comprising a housing surrounding a shaft, a rotatable sleeve connector removably fixed on said shaft and rotating therewith in said housing, a stationary sleeve fixed in said housing surrounding and in bearing contact with said rotatable sleeve, passage means in said housing and stationary sleeve carrying lubricant to the interior of the stationary sleeve in contact with the rotatable sleeve and a continuous pressure lubricant source supplying continuous lubrication to said passage means and between the rotatable and stationary sleeves and wherein the stationary sleeve has an annular groove on its inner surface intermediate its ends and the rotatable sleeve has an annular flange intermediate its ends rotatable in said groove.

16. A bearing and seal structure as claimed in claim 15 wherein the continuous pressure lubricant source is a positive displacement pump supplying lubricant at a pressure greater than the pressure surrounding the bearing and seal.

* * * * *